United States Patent [19]

Chambers, Sr.

[11] Patent Number: 4,482,194
[45] Date of Patent: Nov. 13, 1984

[54] FLUID PRESSURE ASSISTED ROTARY SHAFT SEAL WITH LABYRINTH BUSHING AND REPLACEMENT SEAL SLEEVE CARTRIDGE

[75] Inventor: Joseph W. Chambers, Sr., Santa Ana, Calif.

[73] Assignee: Disposable Waste Systems, Inc., Santa Ana, Calif.

[21] Appl. No.: 531,523

[22] Filed: Sep. 12, 1983

[51] Int. Cl.³ .................... F16C 33/78; F16C 33/80
[52] U.S. Cl. ........................ 384/480; 277/93 SD; 384/482
[58] Field of Search .................. 308/187.1, 187.2; 384/142, 143, 144; 277/93 SD, 93 R

[56] References Cited

U.S. PATENT DOCUMENTS

| | | | |
|---|---|---|---|
| 4,212,475 | 7/1980 | Sedy | 277/93 SD |
| 4,253,713 | 3/1981 | Chambers | 308/187.1 |
| 4,363,490 | 12/1982 | Kuehn | 308/187.1 |
| 4,406,462 | 9/1983 | Witten | 277/93 R |

Primary Examiner—Lenard A. Footland
Attorney, Agent, or Firm—Sughrue, Mion, Zinn, Macpeak and Seas

[57] ABSTRACT

A replaceable wear sleeve cartridge fixedly mounted to a housing bore carries internally the fixed race of an anti-friction bearing and a static seal race. The wear sleeve cartridge defines with a labyrinth preseal bushing fixed to the shaft, the basic elements of a labyrinth preseal and additionally resiliently couples through a seal wedge, a rotating seal race whose end face is both fluid pressure and resiliently biased against the end face of the annular static seal race.

9 Claims, 3 Drawing Figures

FLUID PRESSURE ASSISTED ROTARY SHAFT SEAL WITH LABYRINTH BUSHING AND REPLACEMENT SEAL SLEEVE CARTRIDGE

FIELD OF THE INVENTION

This invention relates to a fluid pressure assisted rotary shaft seal and more particularly to a simplified structure which defines a labyrinth preseal, mounts the anti-friction bearing races and provides a low-cost replaceable insert cartridge which takes the wear for the rotary shaft seal.

BACKGROUND OF THE INVENTION

U.S. Pat. 4,253,713 issued Mar.3, 1981 and assigned to the common corporate assignee describes a fluid pressure assisted high-integrity rotating seal for sealing a shaft projecting through a housing bore and supported for shaft rotation within the bore by an anti-friction bearing. The assembly includes static and rotating seal races whose end faces abut. The patented rotary shaft seal meets requirements for specified dimensions and materials in a wide variety of industry applications and is readily applicable to environments in which gritty liquids, sewage, sludge, corrosive and abrasive can be prevented from reaching the bearings or mechanisms interior of the bearings. The patented rotary shaft seal is characterized by an annular bushing which rotates with the shaft, an annular static seal race, an annular neoprene boot, an annular rotating seal race, an annular carbon insert ring carried by the rotating seal race and an annular resilient seal sleeve. These various parts wear, requiring their replacement. The parts subjected to wear include the major bearing and seal housing components. Maintenance down time is relatively high and replacement of parts is achievable only with some difficulty.

It is therefore an object of the present to provide a improved rotary shaft seal in which the number of parts are minimized, a replaceable cartridge sleeve is provided which is specifically designed to bear the wear during shaft seal usage and which is easily and efficiently replaced to minimize maintenance down time of the apparatus housing the rotary shaft seal.

It is a further object of the present invention to provide such improved rotary shaft seal in which the replaceable wear sleeve cartridge cooperates with a labyrinth preseal bushing to provide a labyrinth preseal leading to the pressure assisted positive fluid seal defined by the annular static seal race, the annular rotating seal race, the replaceable wear sleeve cartridge and the labyrinth preseal bushing.

SUMMARY OF THE INVENTION

The present invention is directed to a fluid pressure assisted rotary shaft seal assembly for sealing a shaft supported for rotation about its axis within a housing bore by an anti-friction bearing interposed between the shaft and the housing bore. The anti-friction bearing has an outer bearing race fixed to the housing and an inner bearing race fixed to the shaft and rotating therewith. The seal assembly comprises an annular bushing fixed to the shaft adjacent the anti-friction bearing and on the high pressure side of the housing. The seal assembly further comprises an annular static seal race not actually between bearing and bushing operatively fixed to the housing and positioned axially between the bushing and the anti-friction bearing and having axially opposed end faces. A rotating annular seal race is operatively fixed to the bushing and has an end face sealably engaging one opposing end face of the static seal race. The improvement comprises a replaceable wear sleeve cartridge sealably fixedly mounted to the housing bore and wherein the annular bushing comprises a labyrinth preseal bushing fixed to the shaft and defining a labyrinth preseal between said labyrinth preseal bushing and the replaceable wear sleeve cartridge.

Preferably, a compressed seal wedge resiliently couples the end face of the rotating seal race opposite that in abutment with said annular static seal race to said bushing. The seal wedge provides a biasing force to the annular rotating seal race to produce the correct closing force between the abutting seal race end faces. The seal wedge may act as a non-clogging rubber drive spring and it also prevents liquid and foreign material from entering the inside of the rotating seal race. Thus, the seal wedge could be capable of performing either the primary or emergency drive function from the bushing to the rotating seal race.

To insure a positive fluid seal downstream of the labyrinth preseal, o-rings are incorporated between the replaceable wear sleeve cartridge and the housing, between the labyrinth preseal bushing and the rotating annular seal race, and between the static seal race and the cartridge.

DESCRIPTION OF THE PREFERRED EMBODIMENTS

Figure 1:
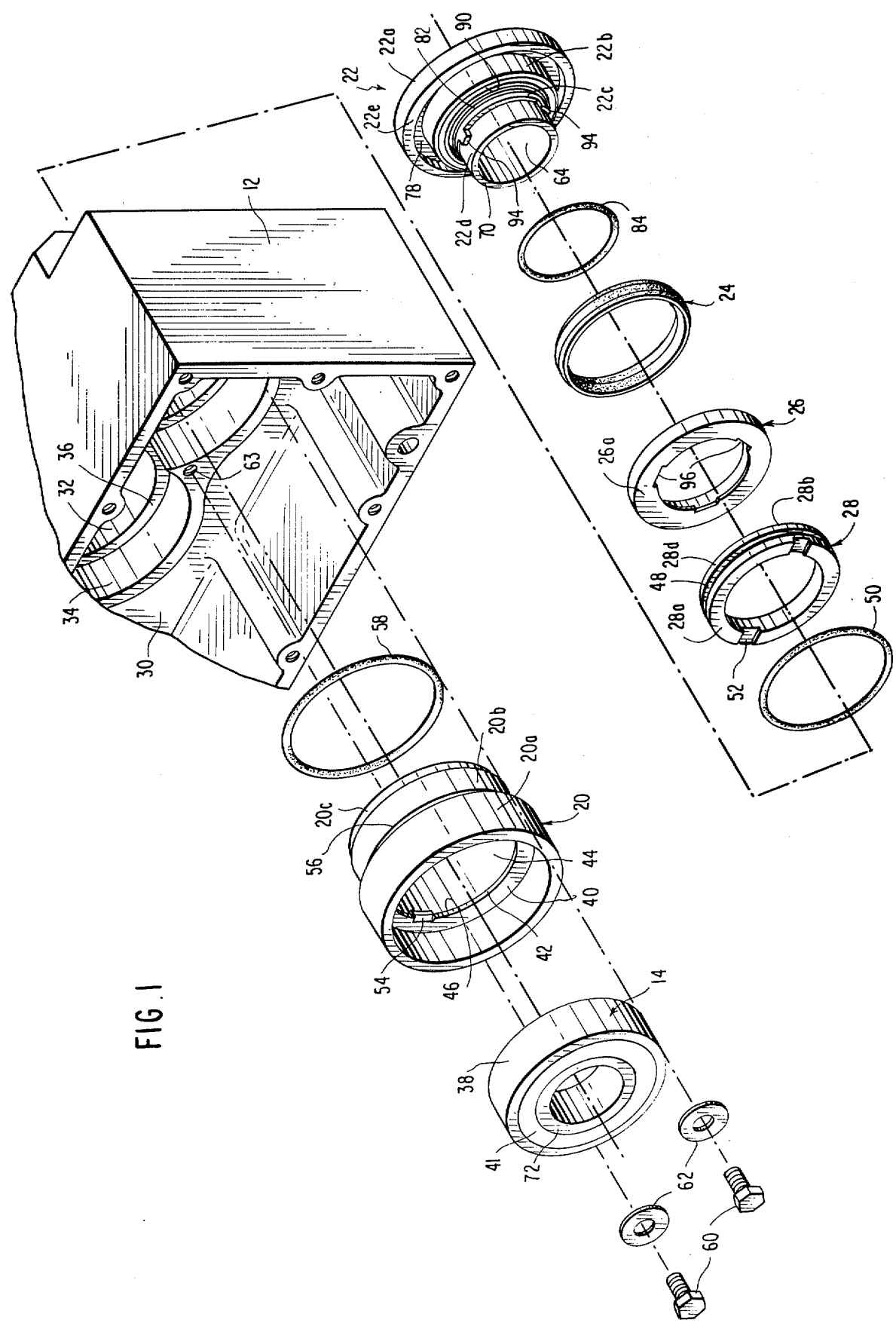
FIG. 1 is an exploded, perspective view of the principal components of the improved rotary shaft seal assembly of the present invention.
Figure 2:
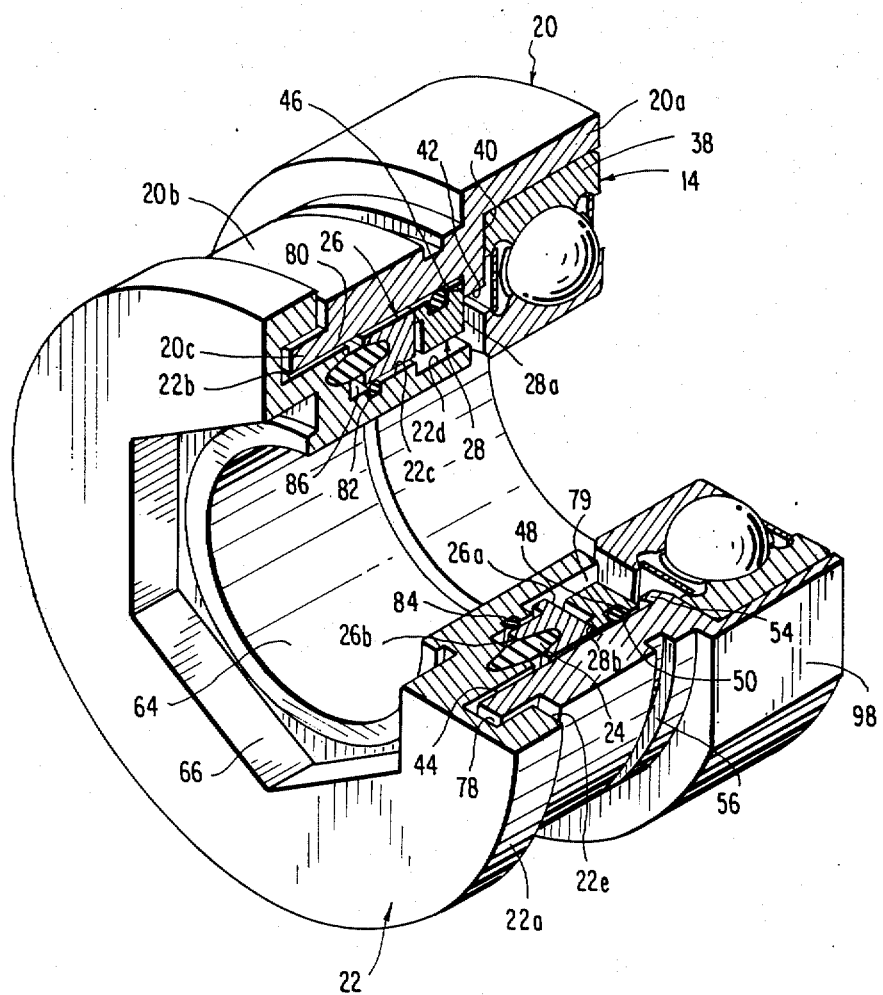
FIG. 2 is a perspective view, partially broken away of the rotary shaft seal assembly of FIG. 1 for application to a shaft mounted for rotation within a housing by antifriction bearings.
Figure 3:
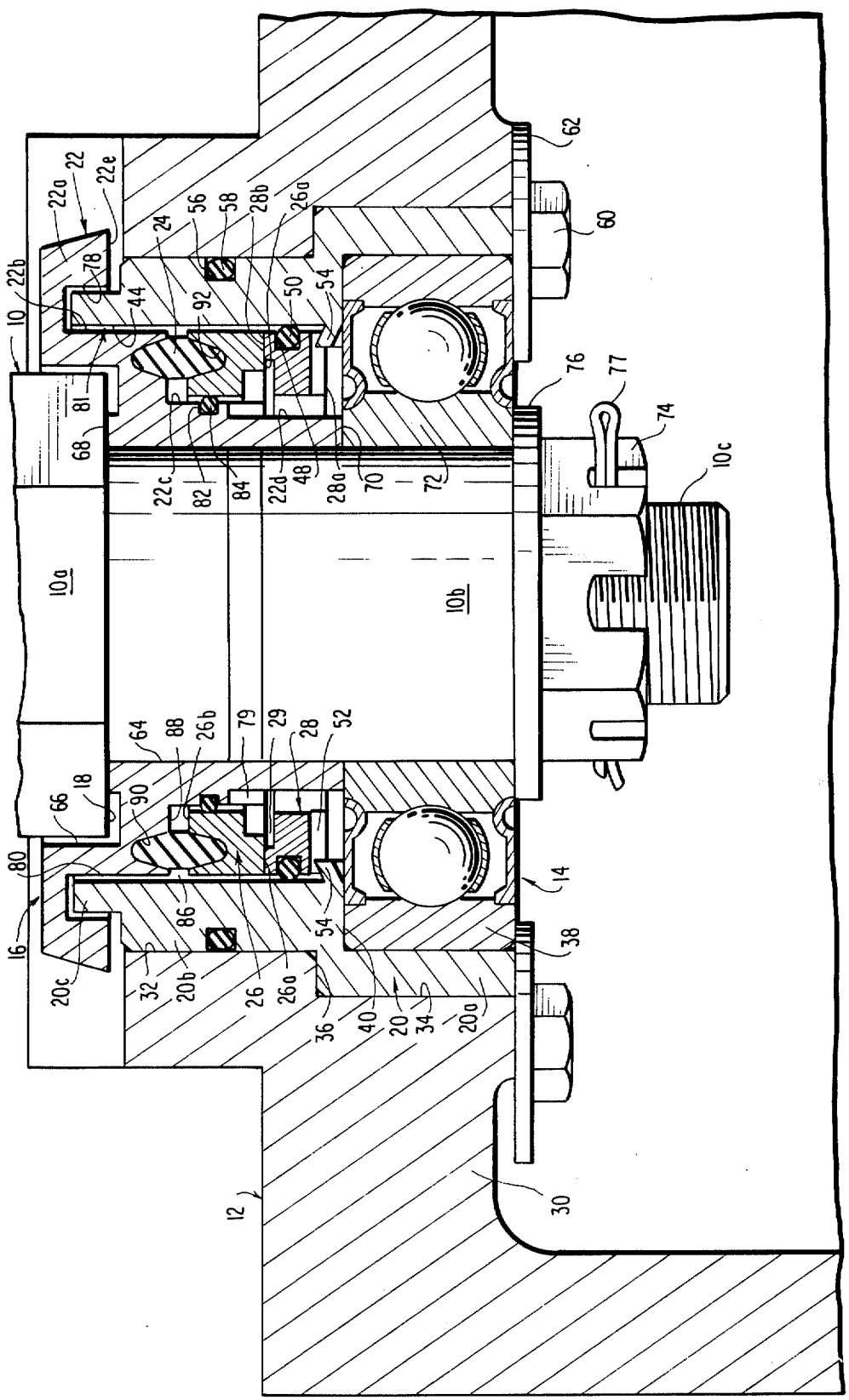
FIG. 3 is a sectional view of the rotary shaft seal assembly of FIG. 1.

In accordance with prior U.S. Pat. No. 4,253,713, to which the present invention is an improvement, a shaft indicated generally at 10 is supported for rotation about its axis within a housing 12 by means of an anti-friction bearing indicated generally at 14. The shaft includes a hexagonal cross section portion 10a and a first reduced diameter cylindrical portion 10b in the area of its support by the anti-friction bearing 14, thereby defining a shoulder 18. The rotary shaft seal assembly indicated generally at 16 is incorporated between the shaft reduced diameter portion 10b and the housing 12. Unlike the prior patented structure, the rotary shaft seal assembly 16 includes the anti-friction bearing 14 as incorporated therein. In that respect, the rotary shaft seal assembly 16 is comprised of a number of principal components. Those components are: a replaceable wear sleeve indicated generally at 20, a labyrinth preseal bushing indicated generally at 22, a seal wedge 24, a positive drive annular rotating seal race indicated generally at 26, and a positive lock annular static seal race indicated generally at 28.

Housing 12 includes a transverse end wall 30, at one end, within which is formed a bore 32 and a counter bore 34, the bore 32 and counter bore 34 defining a shoulder 36. Fixedly mounted within the housing bore 32 and counter bore 34 is the replaceable wear sleeve cartridge 20. The replaceable wear sleeve cartridge 20 is of cylindrical form which may be machined of metal and which is comprised of portion 20a which is radially offset from a reduced diameter portion 20b. Portion 20a has an outer diameter on the order of the diameter of the counter bore 34 so as to be forcefitted thereto. Portion 20a is provided with a inner diameter which is sized to the outer diameter of outer race 38 of the anti-friction bearing 14, which race may be force fitted thereto. As such, portion 20a fixedly mounts the outer race 38 of the anti-friction bearing. Offset portions 20a and 20b of the replaceable wear sleeve cartridge define a radial shoulder 40 against which the outer race 38 of the anti-friction bearing 14 abuts. The reduced diameter portion 20b of the cartridge 20 has an outer diameter which may be slightly smaller than the diameter of bore 32 and is fitted thereto.

Important to the proper operation of the labyrinth preseal and the effective dynamic fluid seal preventing an adverse fluid medium from entering the interior of casing 12 and affecting the anti-friction bearing 14, is the proper sizing of bore 42 and a first counter bore 44 of the replaceable wear sleeve cartridge 20. Bore 42 extends over a short distance, at the juncture between portions 20a and 20b of the cartridge, and defines with counter bore 44 a shoulder or stop 46 against which inner end face 28a of static seal race 28 abuts. The annular static seal race 28 is of L-shaped radial cross-section, the seal race 28 being of ring form and being further provided with an outer axial end face 28b which is in abutment with opposing axial end face 26a of the rotating annular seal race 26. Further, this member which may be made of metal, is provided on its outer periphery 28d with a annular groove 48 within which is positioned an o-ring seal 50. The outer diameter of the annular static seal race 28 is somewhat less than the diameter of counter bore 44, however, the diameter of the o-ring seal 50 is such that it is resiliently deformed and functions to frictionally lock the annular static seal race 28 thereto to effectively form a positive fluid pressure seal between the annular static seal race 28 and the replaceable wear sleeve cartridge 20. As may be best seen in FIG. 1, the static race seal race 28 is provided with diametrically opposed radial grooves or slots 52, FIG. 1, within its inner end face 28a, These receive locking tabs 54 which project axially beyond shoulder 46 of replaceable wear sleeve cartridge 20. The locking tabs 54, by engaging the matching grooves 52, eliminate the possibility that the static seal race 28 might rotate by forces generated between it and the contacting rotating seal race 26. The outer periphery of cartridge portion 20b bears an annular groove 56 within which is positioned an o-ring seal 58 which is compressed between the cartridge and bore 32 of housing 12 to form an effective positive fluid seal preventing any exterior fluid medium under pressure from entering the interior of housing 12 at that point. The cartridge 20 is mounted to bore 32 and counter bore 34 and fixed in position by a series of screws 60 penetrating casing 12 at tapped holes 63, and washers 62 carried thereby. The outer edges of washers 62 overlie the fixed outer race 38 of the anti-friction bearing 14 to maintain that race in position within the enlarged diameter portion 20a of cartridge 20.

The annular labyrinth preseal bushing 22 is fixedly mounted to a shaft 10. In that respect, the annular bushing 22, which is of cylindrical form, has a bore 64 which is on the order of the diameter of the first reduced diameter portion 10b of shaft 10 on which it mounts. Bushing 22 is provided with a hexagonal cross-sectional axial recess 66 within one end of a size in excess of the hexagonal portion 10a of shalt 10 and thus defines a shoulder 68 which abuts shoulder 18 of the shaft when inserted therein. Recess 66 could be square in cross-section, the function being to key the bushing to the shaft. The opposite end 70 of bushing 22 abuts one end face of anti-friction bearing inner race 72. The bearing inner race 72 has a inner diameter approximating that of shaft portion 10b which it surrounds. Shaft 10 terminates in a further reduced diameter threaded portion 10c which bears a hex nut 74, keyed by cotter pin 77. A washer 76 is interposed on the shaft between hex nut 74 and an end face of the anti-friction bearing inner race 72. Thus, the labyrinth preseal bushing is locked axially between the anti-friction bearing inner race 72 and shaft shoulder 18.

Labyrinth preseal bushing 22 functions as the axially outer and radially inner member of the labyrinth preseal. It has a stepped outer configuration, FIG. 1, including a radially enlarged head or collar 22a, a first reduced diameter portion 22b, a further reduced diameter portion 22c and a final reduced diameter portion 22d. Collar 22a includes a annular groove 78 within end face 22e which is of a larger radial width than the radial width of an axially Projecting tip portion 20c of the replaceable wear sleeve cartridge 20. Further, the axial projecting portion 20c of the cartridge is of a length such that it terminates short of the bottom of groove 78. Further, the diameter of reduced diameter portion 22b of the labyrinth preseal bushing 22 is somewhat less than the diameter of counter bore 44 of the replaceable wear sleeve cartridge. A tortuous labyrinth preseal passage 80 is thereby provided for any contaminant fluid medium attempting to reach, under pressure, the interior of housing 12. It should be noted that the labyrinth preseal indicated generally at 81 is upstream fluidwise from the interior of housing 12 and terminates at o-ring 50 axially short of the interior of casing 12. Counter bore 44 of cartridge 20 and reduced diameter portions 22c and 22d are spaced from each other and sized to partially define a dynamic seal cavity 79 therebetween.

Important to the simplified but highly effective rotary shaft seal assembly 16 of the present invention is the makeup and mount of the annular rotating seal race 26. The annular rotating seal race 26 is a ring-like seal element with a wedge cavity and is formed of metal or the like, being of L-shaped cross-section. Its outer diameter is on the order of that of the annular static seal race 28 and the axially outer end face at 26b is of a smaller radial width than that of axially inner end face 26a. End face 26a abuts and rubs against axially outer, radially narrow, annular end face 28b of the annular static seal race 28. The static seal race 28 is recessed at 29 to define the narrow annular end face 28b, with the recess permitting the application of an internal fluid pressure to end face 26a of the rotating seal race 26, the internal pressure functioning to offset the external fluid pressure which is applied to a small portion of axially outer end face 26b which lies radially outside of seal wedge 24. Additionally, this reduces the surface contact area between the rotating seal race and the static seal race. In the past, the seal races in such rotary shaft seal assemblies were purposely formed of tungsten carbide and their contacting faces were quite smooth. This caused substantial frictional contact surface area detrimental to seal operation. While the seal races 26 and 28 in the present invention may also be formed of tungsten carbide, in addition to the axially outer end face 28b of the annular static seal race 28 being very narrow and having limited surface area with respect to the opposing contact end face 26a of the rotating seal race 26, one of these contacting end faces may have a matt finish, while the other may have a mirror finish. As may be appreciated, by increasing the contact area between abutting end faces 26a and 28b, there is a decrease in the reverse pressure surface on the rotating seal race 26 available to overcome the applied pressure of the exterior fluid acting on the axially outer end face 26b of the rotating seal races 26.

Reverse pressure on the seal of the present invention is all but eliminated due to design, machined in characteristics which prevent exposure of surface area, thus generating controlled positive pressure not requiring a balance of negative pressure as in competing rotary shaft seal assemblies. Unlike other seals, the present design does not depend on an external reverse pressure area to maintain seal balance. However, the internal reverse pressure area defined by recess 29 within static seal race 28 (or a similar recess within the opposing face of the rotating seal race 26) may be added, as shown, to maintain balance in high pressure applications. Eliminating external reverse pressure area also eliminates a grit collection area that can cause premature seal failure in dirty environments. Such external reverse pressure area is normally effected by an annular recess within the outer periphery of the rotating seal race opening axially from the end face of that member abutting the static seal race. This is accomplished by keeping the outside diameter of the static and rotating races at the same dimension and eliminating a recess seal surface on the rotating race face. This is further accomplished by the positioning of seal wedge 24 radially relative to the rotating seal race which prevents excess pressure build up behind the rotating seal race 26 by eliminating the square inch surface area exposed to external fluid pressure. The present invention, therefore, provides an extremely effective structure for changing the balance point for the dynamic seal achieved through the axially abutting contact between the rotating seal race 26 and the static seal race 28. The gap between counter bore 44 of the cartridge 20 and the outer periphery of the rotating annular seal race 26 forms a portion of labyrinth preseal passage 80 leading to a dynamic seal defined by the opposing contacting end faces of seal races 26 and 28. The inner diameter of the annular rotating seal race 26 is somewhat larger than outer diameter of recessed portion 22c of the labyrinth preseal bushing 22 and is spaced therefrom. Additionally, the labyrinth preseal bushing 22 is provided with an annular groove 82 within reduced diameter portion 22c of that member, groove 82 containing an o-ring seal 84 whose diameter is such that it is compressed against the inner periphery of the rotating annular seal race 26 to form a positive pressure fluid seal preventing ingress of fluid medium to the interior of casing 12, at this point.

The axial length of the rotating annular seal race 26 is such that there is a fairly large axial gap 86 between the outer end face of the rotating annular seal race and axial end face 88 defined by reduced diameter portions 22b and 22c of the labyrinth preseal bushing 22. The rotating annular seal race 26 is resiliently coupled to the labyrinth preseal bushing 20 by seal wedge 24. Seal wedge 24 formed Preferably of rubber or like elastomeric material is annular in form and oval or diamond shaped in cross-sectional configuration. Shoulder 88 of bushing 22 is provided with an annular groove 90 of V-shaped cross section and the outer end face 26b of the rotating annular seal race 26 is provided with a similarly sized and configured V groove 92. Opposite axial ends of seal wedge 24 fit into respective grooves 90, 92 by compressively distorting the seal wedge. The seal wedge functions to compressively mount the rotating annular seal race 26 to labyrinth preseal bushing 22 which in turn is clamped to the shaft 10 so as to rotate therewith. The seal wedge functions as a rubber non-clogging spring and is in high contrast to standard seals which rely on springs or bellows and which can become impacted with debris. The impaction inhibits spring tension efficiency while, the seal wedge maintains its resilient biasing force tending to maintain the gap 86 and to bias axially inner end face 26a of the annular rotating seal race 26 against outer end face 28b of the annular static seal race 28. However, while the seal wedge may perform a drive function from the bushing 22 through the rotating seal race 26, the present invention utilizes metal drive lobes 94, FIG. 1, to drive the rotating seal race. Lobes 94 project axially from axial shoulder 88 of the labyrinth preseal bushing 22, FIG. 1, and are spaced 120 degrees circumferentially from each other. These metal drive lobes 94 project into axially extending slots 96 within the inner periphery of the annular rotating seal race 26 and which function to positively drive that race through shaft rotation of shaft 10. As may be appreciated, variations in the shape of the wedge and retainers may be made to provide compatibility with the sealing medium depending upon its viscosity or chemical makeup.

The assembly of the components of the high-integrity pressure assisted rotary shaft seal component may be best appreciated by reference to FIG. 1. In that respect, the initial step may comprise the placement of o-ring 84 on bushing 22 and within annular groove 82. The o-ring 84 may be first lightly coated with grease. The seal wedge 24 is then axially placed into groove 90 within the bushing. Next, the rotating annular seal race 26 is slid over the reduced diameter end of bushing 22 such that the V groove 92 receives the other end of seal wedge 24, the o-ring seal 84 being flush against the inner periphery of the rotating seal race 26 and the lobes 94 projecting within respective axial slots 96 of the rotating seal race.

Next, o-ring seal 48 is placed within the groove 46 on the outer periphery of the static race and o-ring seal 58 is placed within the peripheral groove 56 on the reduced diameter portion 20b of the cartridge. The static race 28 with its o-ring seal 48 is then placed into the replaceable wear sleeve cartridge 20 with the interlocking slots 52 within the static race 28 mating with axially projecting tabs 54 of the replaceable wear sleeve cartridge 20. The sealed anti-friction bearings 14 may be installed within the radially enlarged portion 20a of the cartridge. After installing cartridge 20 within housing 12, hex nut 74 and washer 76 may be mounted to a threaded shaft portion 10c and threaded down to lock elements of the rotary shaft seal assembly 16 and the incorporated anti-friction bearing 14 to shaft 10. Snap rings or other similar devices may also be used. Screws 60 bearing washers 62 may be threaded to the tapped holes 63 within housing 12, receiving the same, to lock the replaceable wear sleeve cartridge 20 in position. A reverse procedure may be employed for disassembly.

Importantly, it can be seen that upon the removal of the hex nut 74 and the washer 76 as well as screws 60 and washers 62 the axial removal of the anti-friction bearing 14 permits immediate access to replaceable wear sleeve cartridge 20. Cartridge 20 can be removed without disturbing the components of assembly 16 comprised of preseal bushing 22, seal wedge 24, and the positive drive rotating race 26. The static race 28 which may have been removed with the replaceable wear sleeve cartridge 20 may be reused unless a replacement is necessary. Reassembly for those components is easily and is quickly achieved to again complete the rotary shaft seal 16.

The improved rotary shaft seal utilizes a minimum number of components which have a multiple features contributing to the ease and efficiency in part replacement while minimizing maintenance down time. In that respect the replaceable wear sleeve cartridge 20, while constituting the replaceable wear member, provides a shoulder for the static race to ensure a proper load weight. Its locking tabs, projecting axially, engage the matching grooves in the underside of the static race to prevent static race rotation. The outside diameter of the sleeve is grooved to accept the o-ring which prevents medium leakage between the sleeve cartridge and the housing bore. Of major significance is the fact that the projecting reduced diameter portion 20c of the cartridge closely fits annular groove 78 within head 22a of the labyrinth preseal bushing 22 but is spaced therefrom as is the major length of the outer periphery of the bushing 22 relative to the inner periphery of reduced diameter portion 20b of the cartridge to provide narrow gap labyrinth preseal passage 80 which eliminates grit and material contaminants from packing in and around the sealed cavity. Preferably, a flat 98 is provided to the outer periphery of the enlarged diameter portion 28 of the cartridge which matches a flat on an opposing cartridge (not shown) to prevent two cartridges 20 from rotating within that housing, although two cartridges are not necessary to perform this function. Other retaining devices can be used in single shafted seal applications as in this illustrated embodiment, such as a keyway.

The labyrinth preseal bushing 22 forming the second member of the labyrinth preseal defines preseal labyrinth passage 80. The bushing 22 being grooved within a shoulder 88, at 90, receives one-half of the seal wedge 24 which functions as the rubber drive spring biasing the rotating annular seal ring 26 against the annular static seal race 28. The outside periphery of the labyrinth preseal bushing is grooved at 82 which groove carries the backup o-ring seal 84 contacting the rotating annular seal race 26. The three drive lobes 94, which are equidistantly spaced circumferentially, engage the matching grooves 96 on the rotating annular seal race 26 to ensure a positive drive mechanism in the event that the medium to be sealed is of a thioxyl-tropic nature requiring a high amount of drive toward the rotating race with the seal wedge 24 functioning as a backup drive member, in some cases. Preferably, the labyrinth preseal bushing 22 is formed with precise tolerances required for proper loading of the seal faces of the rotating annular seal race 26 to the annular static seal race 28. Collar or head 22a of the labyrinth preseal bushing including hexagonal recess 66 receives the equally sized and hexagonally configured enlarged diameter portion 10a of shaft 10, thus producing a positive bushing drive.

The configuration and depth of opposing V-shaped grooves 90 and 92 within the labyrinth preseal bushing 22 and the rotating annular seal race 26, respectively, as well as the axial length of seal wedge 24 ensures, under compression, proper spring tension to the rotating annular seal race 26 to produce the correct closing force between dynamic seal faces 28b and 26a for seal races 28 and 26, respectively. Additionally, as stated previously, the seal wedge defines a non-clogging rubber drive spring to prevent liquid and foreign materials from entering the inside of the rotating race. Further, the seal wedge may be capable of performing a drive function if the metal drive lobes on bushing 22 become inoperative, or may function as the primary drive means.

The positive drive rotating annular seal race 26, functioning as a retainer for the other half of the rubber spring/seal wedge 24, in turn, is provided with three drive slots which engage the matching drive lobes on the labyrinth bushing 22. The inner periphery provides the inside seal surface for secondary o-ring seal 84 and its end face functions as a mating surface to the static seal face. The positive lock annular static seal race 28 bears on its outer periphery a groove receiving the primary o-ring seal 48 which bears on the counterbore 44 of cartridge 20. A positive drive is achieved by the two locking slots on the end face 28a of the static race which are 180° apart and which receive matching locking tabs 54 on cartridge 20, under the applied compressive force of the seal wedge 24.

As may be appreciated, a wide variety of materials may be used to make up the various o-rings and seal wedge 24 dependent upon the chemical makeup of the fluid medium to be sealed. The o-rings may be of elastomeric material, as of necessity is the seal wedge 24. The remaining components are preferably formed of a metal such as stainless steel, including the replaceable wear sleeve cartridge 20 and the labyrinth preseal bushing 22. The seal race components may be constructed of Tungsten Carbide, Ceramic, Silicon Carbide, Carbon, Stainless Steel, Ni-Resist, Cast Iron or any combination thereof.

The improved rotary shaft seal is structured to provide seal balance and surfaces exposed to the sealing medium allow pressure in the system to automatically provide the additional closing pressure to the seal faces other than that exerted by the bias of the compressed seal wedge 24.

While the invention has been described in detail and with reference to specific embodiments thereof, it will be apparent to one skilled in the art that various changes and modifications can be made therein without departing from the spirit and scope thereof.

I claim:

1. In a fluid pressure assisted rotary shaft seal assembly for sealing a shaft supported for rotation about its axis within a housing bore by an anti-friction bearing interposed between the shaft and the housing bore, said bearing having an outer bearing race fixed to the housing and an inner bearing race fixed to the shaft and rotating therewith, said seal assembly comprising:

an annular bushing operatively fixed to said shaft adjacent the anti-friction bearing on the high pressure side of the housing, an annular static seal race operatively fixed to said housing and having axially opposed end faces, an annular rotating seal race operatively coupled to said shaft and having an end face sealably engageable with one opposing end face of said static seal race, the improvement comprising:

a replaceable wear sleeve cartridge fixedly mounted to said housing bore, being concentric to said annular bushing over at least a portion of its length and spaced therefrom to define an annular cavity therebetween to the side of said anti-friction bearing, said static seal race being mounted within said cavity and rotatably fixed to said replaceable wear sleeve cartridge, means resiliently compressibly coupling said rotating seal race to said bushing within said cavity for rotation therewith, means including said bushing and said cartridge defining a labyrinth preseal exterior of said casing, and means including said replaceable wear sleeve cartridge, said annular bushing and said seal races defining a positive fluid pressure seal internally of said cavity for preventing any exterior fluid medium from penetrating the interior of the casing through said assembly.

2. The rotary shaft seal assembly as claimed in claim 1 wherein said means for resiliently compressibly coupling said rotating seal race to said bushing comprises an elastomeric seal wedge interposed axially between said bushing and said rotating seal race, and wherein the axial length of said cavity, said seal races and said wedge, are such that said seal wedge is placed under axial compression to resiliently bias confronting end faces of said seal races into sealing a contact with each other.

3. The rotary shaft seal assembly as claimed in claim 2 wherein, said bushing includes a reduced diameter portion defining a radially projecting shoulder functioning as a radial endwall of said cavity, said shoulder includes a annular groove of a V-shaped cross section, an axial end face of said rotating seal race carries a corresponding V-shaped annular groove facing said V-shaped groove within said shoulder and wherein said seal wedge is of diamondshaped radial cross section having seal wedge halves fitted respectively into said V-shaped grooves of said bushing shoulder and said rotating seal respectively such that said seal wedge under axial compression functions as a positive fluid pressure seal between said seal races.

4. The rotary shaft seal assembly as claimed in claim 3 wherein said bushing further comprises a radially enlarged collar at the end of said bushing remote from said anti-friction bearing, said collar includes an annular groove within a radial end face proximate to said replaceable wear sleeve cartridge, and said replaceable wear sleeve cartridge at its end remote from the anti-friction bearing is positioned within said collar annular groove and is of a radial width which is less than that of said collar annular groove and terminates short of the bottom of the collar annular groove so as to define a labyrinth preseal passage therebetween and said bushing and said cartridge further defining a continuing labyrinth preseal passage leading from said collar annular groove to said cavity bearing said static and rotating seal races.

5. The rotary shaft seal assembly as claimed in claim 4, wherein said positive fluid pressure seal means comprises an annular groove within the outer periphery of said bushing at said cavity facing the inner periphery of said annular rotating seal race and a first o-ring seal mounted within that annular cavity and sealingly engaging the inner periphery of said annular rotating seal race, an annular groove within the outer periphery of said annular static seal race facing the inner periphery of said cartridge at said cavity and a second o-ring mounted within said annular static seal race groove and sealably engaging the inner periphery of said cartridge whereby said seal races provide first and second positive fluid seals within said cavity, downstream of said labyrinth preseal means.

6. The rotary shaft seal assembly as claimed in claim 2, wherein said positive fluid pressure seal means comprises an annular groove witin the outer periphery of said bushing at said cavity facing the inner periphery of said annular rotating seal race and a first 0 ring seal mounted within that annular groove and sealingly engaging the inner periphery of said annular rotating seal race, an annular groove within the outer periphery of said annular static seal race facing the inner periphery of said cartridge at said cavity, and a second o-ring mounted within said annular static seal race groove and sealably engaging the inner periphery of said cartridge facing said static seal race to provide first and second positive fluid seals within said cavity, downstream of said labyrinth preseal means.

7. The rotary shaft seal assembly as claimed in claim 3, wherein said positive fluid pressure seal means comprises an annular groove within the outer periphery of said bushing at said cavity facing the inner periphery of said annular rotating seal race and a first o-ring seal mounted within that annular groove and sealingly engaging the inner periphery of said annular rotating seal race, an annular groove withinthe outer periphery of said annular static seal race facing the inner periphery of said cartridge at said cavity and a second o-ring mounted within said annular static seal race groove and sealably engaging the inner periphery of said cartridge whereby said seal races provide first and second positive fluid seals within said cavity, downstream of said labyrinth preseal means.

8. The rotary shaft seal assembly as claimed in claim 2, wherein said elastomeric seal wedge is radially positioned relative to said rotating seal race, and the outer periphery of said rotating seal race is unrecessed such that a balanced pressure seal is effected between said rotating seal race and said static seal race with said elastomeric seal wedge providing the principal force maintaining axial engagement between contacting end faces of said seal races.

9. The rotary shaft seal as claimed in claim 1, wherein one of said annular rotating seal race and said annular static seal race includes an annular recess therein on its inner periphery over a portion of its radius on the end face sealably engaging the opposing end face of said other seal race to form means for applying an internal fluid balancing pressure acting in opposition to the external fluid pressure acting on said annular rotating seal race via said labyrinth preseal.

* * * * *